US012283218B2

(12) United States Patent
Ma et al.

(10) Patent No.: US 12,283,218 B2
(45) Date of Patent: Apr. 22, 2025

(54) DRIVING CIRCUIT, DISPLAY DEVICE, AND DRIVING METHOD

(71) Applicants: Beijing BOE Display Technology Co., Ltd., Beijing (CN); BOE TECHNOLOGY GROUP CO., LTD., Beijing (CN)

(72) Inventors: Wenpeng Ma, Beijing (CN); Shulin Yao, Beijing (CN); Yanping Liao, Beijing (CN); Panhui Zhao, Beijing (CN); Dongchuan Chen, Beijing (CN); Pengfei Hu, Beijing (CN); Zheng Zhang, Beijing (CN); Yingmeng Miao, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/027,534

(22) PCT Filed: Mar. 30, 2022

(86) PCT No.: PCT/CN2022/084071
§ 371 (c)(1),
(2) Date: Mar. 21, 2023

(87) PCT Pub. No.: WO2023/184238
PCT Pub. Date: Oct. 5, 2023

(65) Prior Publication Data

US 2024/0296775 A1 Sep. 5, 2024

(51) Int. Cl.
*G09G 5/00* (2006.01)
*G09G 3/20* (2006.01)

(52) U.S. Cl.
CPC ......... *G09G 3/2092* (2013.01); *G09G 3/2007* (2013.01); *G09G 2300/0408* (2013.01); *G09G 2310/0286* (2013.01); *G09G 2310/08* (2013.01)

(58) Field of Classification Search
CPC ............... G09G 3/2092; G09G 3/2007; G09G 2300/0408; G09G 2310/0286; G09G 2310/08

(Continued)

(56) References Cited

U.S. PATENT DOCUMENTS 10,115,366 B2 10/2018 Choi
2011/0273417 A1 * 11/2011 Shin ......................... G09G 3/20 345/211

(Continued)

FOREIGN PATENT DOCUMENTS

CN 101266762 B 7/2012
CN 103714785 B 4/2014

(Continued)

OTHER PUBLICATIONS

International Search Report in PCT/CN2022/084071 in Chinese dated Sep. 5, 2022.

(Continued)

*Primary Examiner* — Jennifer T Nguyen
(74) *Attorney, Agent, or Firm* — Collard & Roe, P.C.; William Collard

(57) ABSTRACT

A driving circuit, a display device, and a driving method are disclosed. The driving circuit includes a level conversion unit and a gate electrode driving unit; and the gate electrode driving unit is configured to sequentially shift and output a plurality of first gate scan signals by a first portion of the 2n gate signal output terminals in response to a first portion of the plurality of first output signals received at a first moment (Continued)

100 by a first portion of the plurality of second clock signal input terminals, and sequentially output a plurality of second gate scan signals by a second portion of the 2n gate signal output terminals in response to a second portion of the plurality of first output signals received at a second moment by a second portion of the plurality of second clock signal input terminals.

20 Claims, 8 Drawing Sheets

(58) Field of Classification Search
USPC .......................................................... 345/205
See application file for complete search history.

(56) References Cited

U.S. PATENT DOCUMENTS

| | | | | |
|---|---|---|---|---|
| 2015/0187297 | A1 | 7/2015 | Park | |
| 2015/0187314 | A1* | 7/2015 | Choi | G09G 3/2092 345/99 |
| 2016/0189646 | A1 | 6/2016 | Hong et al. | |
| 2017/0213513 | A1 | 7/2017 | Kuo et al. | |
| 2020/0265762 | A1 | 8/2020 | Zhao et al. | |
| 2021/0125568 | A1 | 4/2021 | Yuan et al. | |
| 2021/0366352 | A1* | 11/2021 | Zou | G09G 3/2092 |
| 2022/0036789 | A1 | 2/2022 | Guo et al. | |
| 2023/0185754 | A1* | 6/2023 | Shin | G06F 13/4282 710/315 |

FOREIGN PATENT DOCUMENTS

| | | | |
|---|---|---|---|
| CN | 104751812 | B | 7/2015 |
| CN | 105118450 | A | 12/2015 |
| CN | 105304050 | A | 2/2016 |
| CN | 106782357 | A | 5/2017 |
| CN | 106898292 | A | 6/2017 |
| CN | 107909972 | A | 4/2018 |
| CN | 105741732 | B | 11/2018 |
| CN | 110381273 | A | 10/2019 |
| CN | 110782827 | A | 2/2020 |
| CN | 111883082 | A | 11/2020 |
| CN | 109523965 | B | 7/2021 |

OTHER PUBLICATIONS

Written Opinion in PCT/CN2022/084071 in Chinese dated Sep. 5, 2022.

* cited by examiner

DRIVING CIRCUIT, DISPLAY DEVICE, AND DRIVING METHOD

CROSS REFERENCE TO RELATED APPLICATIONS

This application is the National Stage of PCT/CN2022/084071 filed on Mar. 30, 2022. The present application claims priority to and the benefit of the above-identified applications and the above-identified applications are incorporated by reference herein in their entirety.

TECHNICAL FIELD

Embodiments of the present disclosure relate to a driving circuit, a display device, and a driving method.

BACKGROUND

In the field of display technical, for example, a pixel array of a liquid crystal display panel generally includes a plurality of rows of gate lines and a plurality of columns of data lines intersecting with the plurality of rows of gate lines. The driving of the gate lines may be achieved by a bound integrated driving circuit. In recent years, with the continuous improvement of the manufacturing process of amorphous silicon thin film transistors or oxide thin film transistors, a gate line driving circuit can also be directly integrated on a thin film transistor array substrate to form a GOA (Gate driver On Array) to drive the gate lines. For example, a GOA including a plurality of cascaded shift register units may be used to provide on-off state voltage signals (scan signals) for the plurality of rows of gate lines of the pixel array, so as to control the plurality of rows of gate lines to be sequentially turned on, and the data lines further provide data signals to pixel units of corresponding rows in the pixel array, so as to form grayscale voltages required for each grayscale of a display image in each pixel unit, thereby displaying a frame of image.

SUMMARY

At least one embodiment of the present disclosure provides a driving circuit, comprising a level conversion unit and a gate electrode driving unit. The level conversion unit comprises a plurality of first clock signal input terminals and a plurality of first clock signal output terminals, and the level conversion unit is configured to convert a plurality of first clock signals received by the plurality of first clock signal input terminals into a plurality of second clock signals and provide a plurality of first output signals to the gate electrode driving unit by the plurality of first clock signal output terminals, respectively; the gate electrode driving unit comprises a plurality of second clock signal input terminals and 2n gate signal output terminals, the plurality of second clock signal input terminals are configured to receive the plurality of first output signals, and n is an integer greater than or equal to 1; and the gate electrode driving unit is configured to sequentially shift and output a plurality of first gate scan signals by a first portion of the 2n gate signal output terminals in response to a first portion of the plurality of first output signals received at a first moment by a first portion of the plurality of second clock signal input terminals, and sequentially output a plurality of second gate scan signals by a second portion of the 2n gate signal output terminals in response to a second portion of the plurality of first output signals received at a second moment by a second portion of the plurality of second clock signal input terminals.

For example, in the driving circuit provided by an embodiment of the present disclosure, an amount of the plurality of first clock signal input terminals is less than or equal to an amount of the plurality of first clock signal output terminals.

For example, in the driving circuit provided by an embodiment of the present disclosure, the first portion of the 2n gate signal output terminals are odd-numbered output terminals, and the second portion of the 2n gate signal output terminals are even-numbered output terminals.

For example, in the driving circuit provided by an embodiment of the present disclosure, at the first moment, the level conversion unit outputs at least one clock signal by a first portion of the plurality of first clock signal output terminals, so that the first portion of the plurality of first output signals is at least one clock signal, and a second portion of the plurality of clock signal output terminals outputs a non-trigger signal; and at the second moment, the level conversion unit outputs at least one clock signal by the second portion of the plurality of first clock signal output terminals, so that the second portion of the plurality of first output signals is at least one clock signal, and the first portion of the plurality of clock signal output terminals outputs a non-trigger signal.

For example, in the driving circuit provided by an embodiment of the present disclosure, the level conversion unit further comprises a control signal receiving terminal and a control signal output terminal; the control signal receiving terminal comprises a first receiving terminal and a second receiving terminal, and the control signal output terminal comprises a first output terminal and a second output terminal; the first receiving terminal is configured to receive a frame start signal, and the first output terminal is configured to provide the frame start signal to the gate electrode driving unit, so that the gate electrode driving unit starts to shift and output a gate scan signal in response to the frame start signal; and the second receiving terminal is configured to receive a reset signal, and the second output terminal is configured to provide the reset signal to the gate electrode driving unit, so that the gate electrode driving unit performs resetting in response to the reset signal.

For example, in the driving circuit provided by an embodiment of the present disclosure, the level conversion unit comprises a first conversion unit and a second conversion unit; the first conversion unit comprises a first portion of the plurality of first clock signal output terminals, and the first portion of the plurality of first clock signal output terminals is configured to provide the first portion of the plurality of first output signals to the gate electrode driving unit; and the second conversion unit comprises a second portion of the plurality of first clock signal output terminals, and the second portion of the plurality of first clock signal output terminals is configured to provide the second portion of the plurality of first output signals to the gate electrode driving unit.

For example, in the driving circuit provided by an embodiment of the present disclosure, the first conversion unit and the second conversion unit are integrated on a same chip.

For example, in the driving circuit provided by an embodiment of the present disclosure, the first conversion unit and the second conversion unit are respectively on different chips.

For example, the driving circuit provided by an embodiment of the present disclosure further comprises a timing controller, the timing controller comprises a plurality of initial clock signal output terminals, and the timing controller is configured to provide the plurality of first clock signals to the level conversion unit by the plurality of initial clock signal output terminals.

For example, in the driving circuit provided by an embodiment of the present disclosure, the timing controller is further configured to provide a data signal of a display row, and a data signal of a display row provided at the first moment is different from a data signal of a display row provided at the second moment.

For example, in the driving circuit provided by an embodiment of the present disclosure, the data signal of the display row provided at the first moment and the data signal of the display row provided at the second moment are complementary to each other.

For example, in the driving circuit provided by an embodiment of the present disclosure, the level conversion unit comprises a first conversion unit and a second conversion unit; the plurality of initial clock signal output terminals comprises a first output terminal group and a second output terminal group; the first output terminal group is configured to provide a first portion of the plurality of first clock signals to the first conversion unit; and the second output terminal group is configured to provide a second portion of the plurality of first clock signals to the second conversion unit.

At least one embodiment of the present disclosure provides a display device, comprising the driving circuit according to any one of the embodiments of the present disclosure and a display panel, the display panel is coupled to the driving circuit, and the driving circuit is configured to provide the plurality of first gate scan signals and the plurality of second gate scan signals to the display panel.

At least one embodiment of the present disclosure provides a driving method, applied to the driving circuit according to any one of the embodiments of the present disclosure, and the driving method comprises: converting the plurality of first clock signals into the plurality of second clock signals in response to the plurality of first clock signal input terminals receiving the plurality of first clock signals, and providing the plurality of first output signals to the plurality of second clock signal input terminals by the plurality of first clock signal output terminals; sequentially shifting and outputting the plurality of first gate scan signals by the first portion of the 2n gate signal output terminals in response to the first portion of the plurality of first output signals received at the first moment by the first portion of the plurality of second clock signal input terminals; and sequentially shifting and outputting the plurality of second gate scan signals by the second portion of the 2n gate signal output terminals in response to the second portion of the plurality of first output signals received at the second moment by the second portion of the plurality of second clock signal input terminals.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. Likewise, terms such as "a," "an," or "the" do not indicate a limitation of amount, but rather indicate the presence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

Figure 1A:
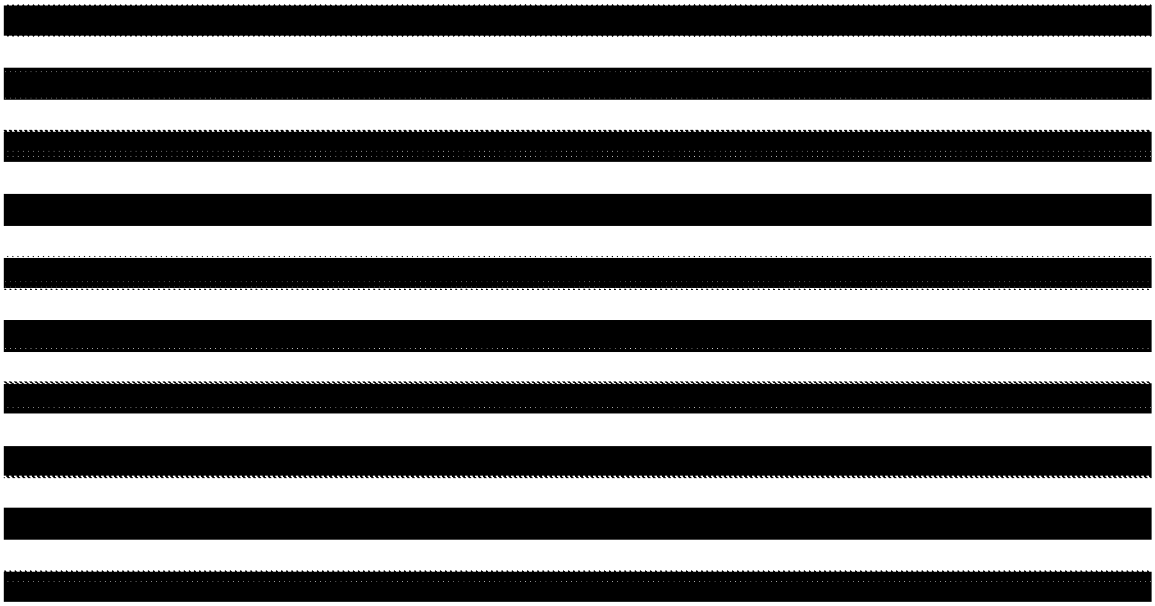
FIG. 1A illustrates a schematic diagram of a special image provided by at least one embodiment of the present disclosure.

With the development of science and technology and the improvement of living standards, some special images need to be displayed by a display device, for example, for testing, analysis, viewing, etc. Using a gate electrode driving circuit to drive, for example, gate lines of a liquid crystal display panel may have the problem of displaying in a wrong row or displaying errors, resulting in lower display quality of the special image. In some embodiments of the present disclosure, for example, the special image may be an image interlacedly displayed by using M rows of pixels as a unit in a pixel array. For example, M is an integer greater than or equal to 1. FIG. 1A illustrates a schematic diagram of a special image provided by at least one embodiment of the present disclosure. As illustrated in FIG. 1A, in this example, M is equal to 1, and the special image is an image of black alternating with white.

At least one of embodiment of the present disclosure provides a driving circuit and a display device. The driving circuit includes a level conversion unit and a gate electrode driving unit, the level conversion unit includes a plurality of first clock signal input terminals and a plurality of first clock signal output terminals, and the level conversion unit is configured to convert a plurality of first clock signals received by the plurality of first clock signal input terminals into a plurality of second clock signals and provide a plurality of first output signals to the gate electrode driving unit by the plurality of first clock signal output terminals, respectively; the gate electrode driving unit includes a plurality of second clock signal input terminals and 2n gate signal output terminals, the plurality of second clock signal input terminals are configured to receive the plurality of first output signals, and n is an integer greater than or equal to 1; and the gate electrode driving unit is configured to sequentially shift and output a plurality of first gate scan signals by a first portion of the 2n gate signal output terminals in response to a first portion of the plurality of first output signals received at a first moment by a first portion of the plurality of second clock signal input terminals, and sequentially output a plurality of second gate scan signals by a second portion of the 2n gate signal output terminals in response to a second portion of the plurality of first output signals received at a second moment by a second portion of the plurality of second clock signal input terminals. The driving circuit can alleviate or avoid displaying in a wrong row of the special image or displaying errors of the special image, thereby improving the display quality of the special image.

Figure 1B:
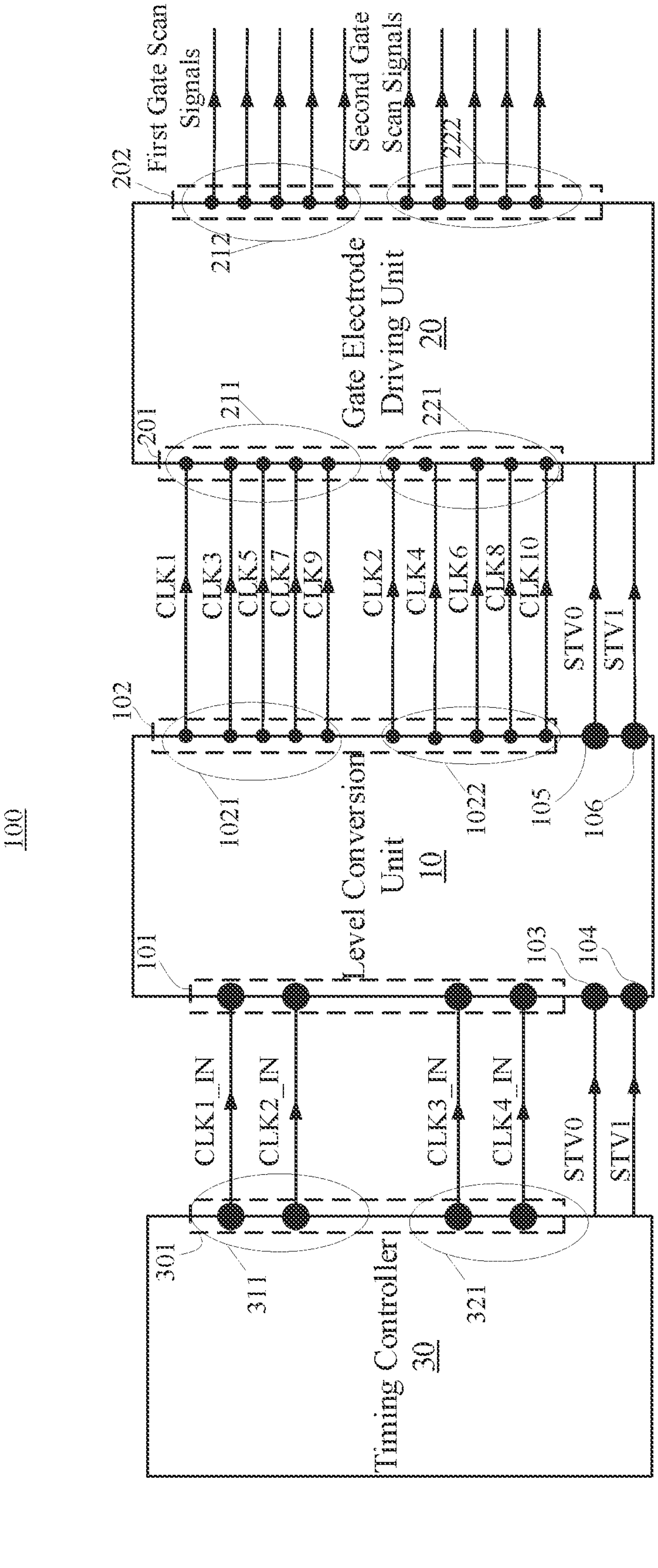
FIG. 1B illustrates a block diagram of a driving circuit provided by at least one embodiment of the present disclosure.

FIG. 1B illustrates a block diagram of a driving circuit provided by at least one embodiment of the present disclosure. For example, the driving circuit is applied for a display device which includes a display panel, and therefore the driving circuit is used to drive the display panel to perform display operation. The display panel may be, for example, a liquid crystal television panel, an organic light emitting diode (OLED) display panel, a quantum dot light emitting diode (QLED) display panel, and the like.

As illustrated in FIG. 1B, the driving circuit 100 includes a level conversion unit 10 and a gate electrode driving unit 20. The level conversion unit 10 is coupled to the gate electrode driving unit 20, and the gate electrode driving unit 20 may be coupled to a pixel array (not illustrated in FIG. 1B, please refer to the following description) of the display panel. The pixel array includes a plurality of rows and columns of pixels.

The level conversion unit 10 includes a plurality of first clock signal input terminals 101 and a plurality of first clock signal output terminals 102. The level conversion unit 10 is configured to convert a plurality of first clock signals (for example, a plurality of first clock signals CLK1_IN-CLK4_IN as illustrated in FIG. 1B) received by the plurality of first clock signal input terminals 101 into a plurality of second clock signals and provide a plurality of first output signals (for example, a plurality of first output signals CLK1-CLK10 as illustrated in FIG. 1B) to the gate electrode driving unit 20 by the plurality of first clock signal output terminals 102, respectively.

The gate electrode driving unit 20 includes a plurality of second clock signal input terminals 201 and 2n gate signal output terminals 202, the plurality of second clock signal input terminals 201 are configured to receive the plurality of first output signals, and n is an integer greater than or equal to 1. For example, each of the 2n gate signal output terminals is used to provide a gate scan signal for a row of pixels in the pixel array of the display panel, so the 2n gate signal output terminals 202 can provide gate scan signals for 2n pixel rows, respectively. Each pixel includes, for example, a switching element to receive a corresponding gate scan signal and a data signal, and the switching element is turned on or off according to the gate scan signal to receive the data signal or not.

In some embodiments of the present disclosure, for example, the amount 2n of gate signal output terminals 202 is an integer multiple of the amount of second clock signal input terminals 201, so that the plurality of second clock signal input terminals 201 provide signals to the 2n gate signal output terminals 202 as a cyclic group, so that the 2n gate signal output terminals 202 output the gate scan signals.

The gate electrode driving unit 20 is configured to sequentially shift and output a plurality of first gate scan signals by a first portion 212 of the 2n gate signal output terminals 202 in response to a first portion (for example, a first output signal CLK1, a first output signal CLK3, a first output signal CLK5, a first output signal CLK7 and a first output signal CLK9 as illustrated in FIG. 1B) of the first output signals received at a first moment by a first portion 211 of the plurality of second clock signal input terminals 201, and sequentially shift and output a plurality of second gate scan signals by a second portion 222 of the 2n gate signal output terminals 202 in response to a second portion (for example, a first output signal CLK2, a first output signal CLK4, a first output signal CLK6, a first output signal CLK8 and a first output signal CLK10 as illustrated in FIG. 1B) of the first output signals received at a second moment by a second portion 221 of the plurality of second clock signal input terminals 201.

The driving circuit 100 divides a plurality of output signals (e.g., the first output signals) of the level conversion unit 10 into a plurality of portions (e.g., the first portion and the second portion) that can be respectively outputted to the gate electrode driving unit 20 at different moments, so that the gate electrode driving unit 20 outputs the first gate scan signals and the second gate scan signals at different moments, and therefore, switching elements of pixels in pixel rows corresponding to the first gate scan signals and switching elements of pixels in pixel rows corresponding to the second gate scan signals in the pixel array are turned on sequentially at different moments, thereby alleviating or avoiding the problem of display in a wrong row or displaying errors in the pixel rows corresponding to the first gate scan signals and the pixel rows corresponding to the second gate scan signals.

In some embodiments of the present disclosure, the level conversion unit 10 is implemented as a level conversion circuit or a chip for level conversion. For example, the level conversion unit 10 changes the period or amplitude of each of the plurality of first clock signals to obtain the plurality of second clock signals. For example, the level conversion unit 10 increases the voltage amplitude and period of the plurality of first clock signals.

Figure 1C:
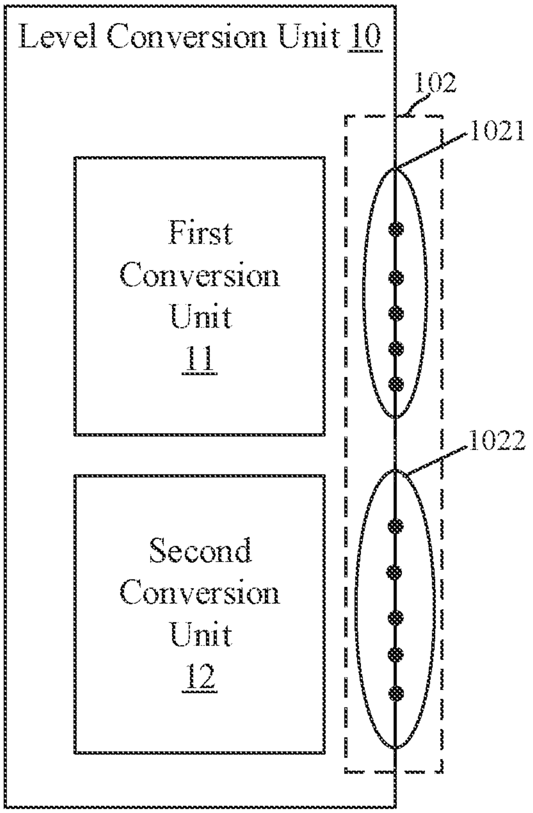
FIG. 1C illustrates a schematic diagram of a level conversion unit applied to FIG. 1B provided by at least one embodiment of the present disclosure.

FIG. 1C illustrates a schematic diagram of a level conversion unit applied to FIG. 1B provided by at least one embodiment of the present disclosure.

As illustrated in FIG. 1C, the level conversion unit 10 includes a first conversion unit 11 and a second conversion unit 12.

The first conversion unit 11 includes a first portion 1021 of the plurality of first clock signal output terminals 102, and the first portion 1021 of the plurality of first clock signal output terminals 102 provides a first portion of the plurality of first output signals to the gate electrode driving unit 20. The second conversion unit includes a second portion 1022 of the plurality of first clock signal output terminals 102, and the second portion 1022 of the plurality of first clock signal output terminals 102 provides a second portion of the plurality of first output signals to the gate electrode driving unit 20.

In the example of FIG. 1C, for example, the first conversion unit 11 and the second conversion unit 12 are formed in the same level conversion circuit or integrated in the same chip.

In other embodiments, the first conversion unit and the second conversion unit may be formed in different level conversion circuits or different chips, respectively.

In some embodiments of the present disclosure, as illustrated in FIG. 1B, the gate electrode driving unit 20 is, for example, a gate electrode driving circuit (GOA) that is manufactured on an array substrate of the display panel, and the GOA is connected to a level conversion chip to receive a plurality of first output signals from the level conversion chip by a plurality of second clock signal input terminals of the GOA. For example, the gate electrode driving circuit includes a plurality of cascaded shift register units.

Figure 4A:
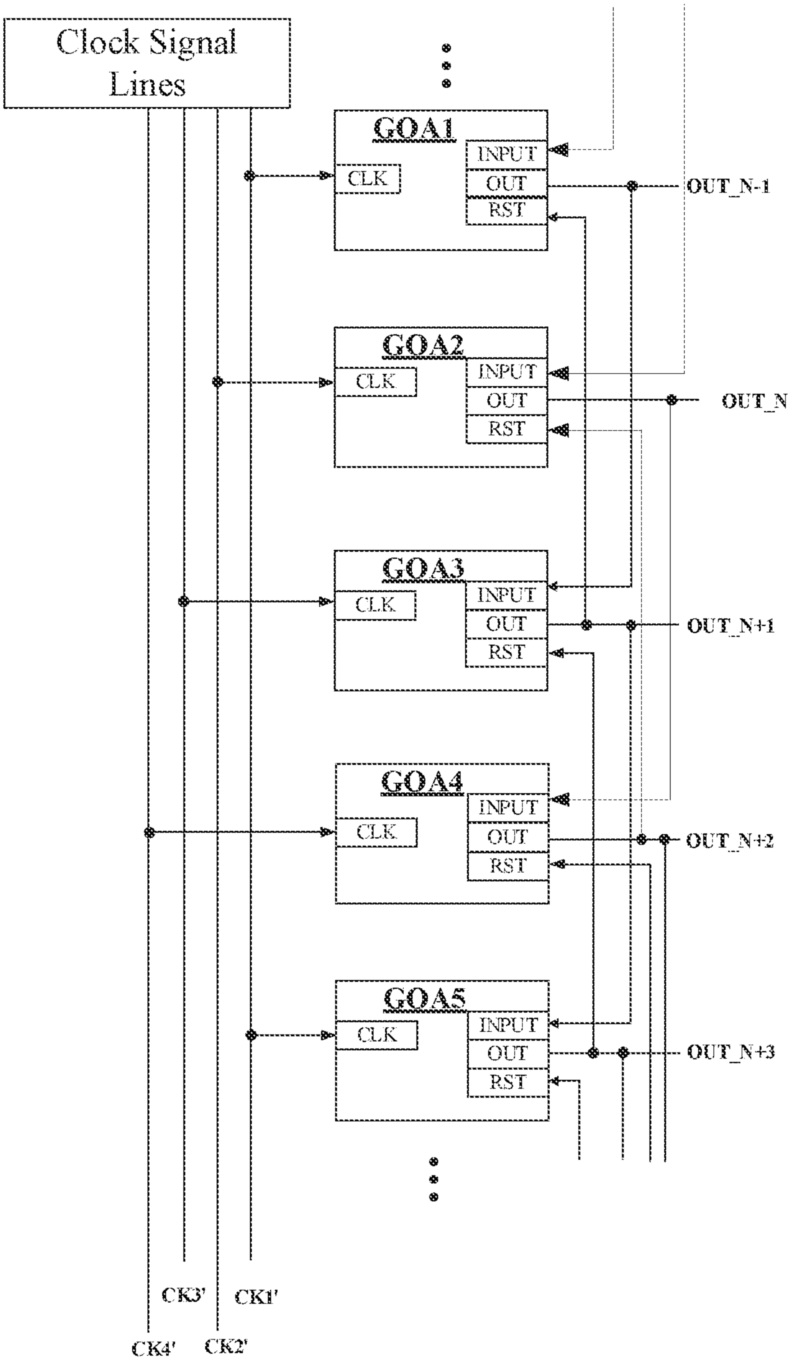
FIG. 4A illustrates a schematic structural diagram of a gate electrode driving unit provided by at least one embodiment of the present disclosure.
Figure 4B:
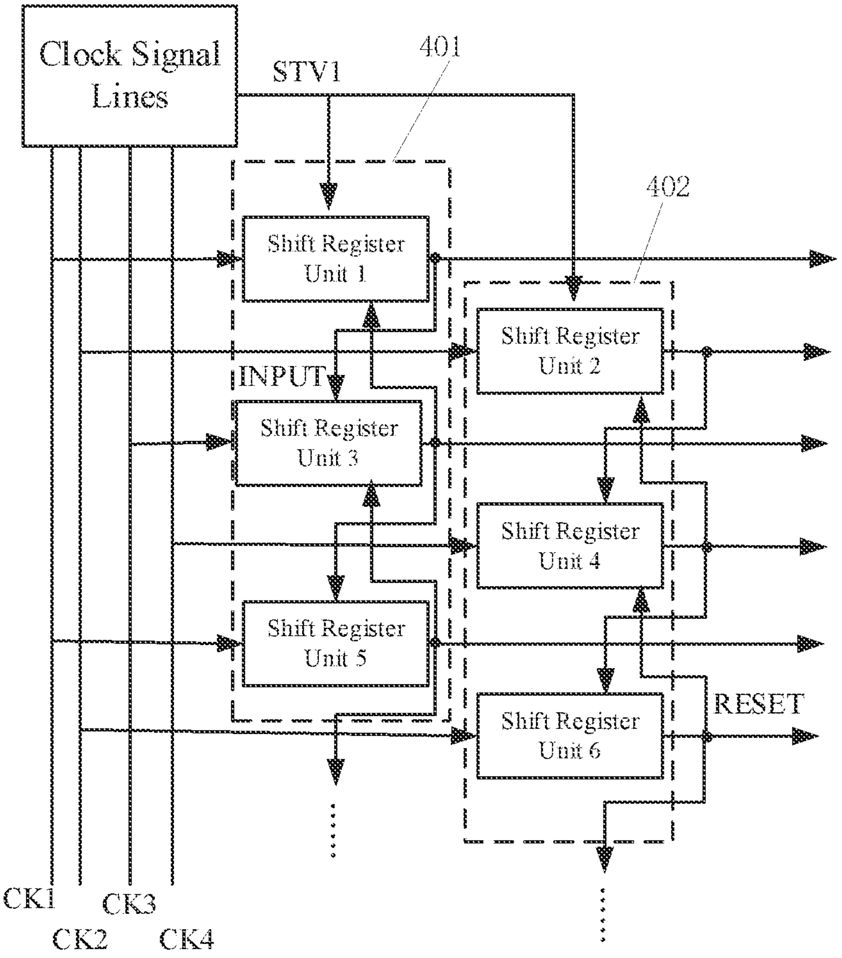
FIG. 4B illustrates a schematic structural diagram of another gate electrode driving unit provided by at least one embodiment of the present disclosure.

In the embodiments of the present disclosure, for example, the GOA is configured to support grouping control for the gate lines in the pixel array of the display panel. For example, the GOA includes a first shift register unit group and a second shift register unit group, the first shift register unit group is configured to provide gate scan signals for odd-numbered rows of gate lines in the display panel, and the second shift register unit group is configured to provide gate scan signals for even-numbered rows of gate lines in the display panel. For example, the first shift register unit group includes a first portion of the plurality of second clock signal input terminals and a first portion of the 2n gate signal output terminals, and the first portion of the 2n gate signal output terminals sequentially shifts and outputs a plurality of the first gate scan signals in response to the first portion of the first output signals that is received. The second shift register unit group includes a second portion of the plurality of second clock signal input terminals and a second portion of the 2n gate signal output terminals, and the second portion of the 2n gate signal output terminals sequentially shifts and outputs a plurality of second gate scan signals in response to the second portion of the first output signals that is received. FIG. 4A and FIG. 4B schematically illustrate schematic diagrams of two GOAs, both of which may be used, for example, in the driving circuit illustrated in FIG. 1B. Please refer to the description below in conjunction with FIG. 4A and FIG. 4B.

As illustrated in FIG. 1B, the driving circuit further includes a timing controller 30 in addition to the level conversion unit 10 and the gate electrode driving unit 20.

The timing controller 30 includes a plurality of initial clock signal output terminals 301 and is configured to provide a plurality of first clock signals to the level conversion unit 10 through the plurality of initial clock signal output terminals 301, so that the level conversion unit 10 converts the plurality of first clock signals into a plurality of second clock signals.

In some embodiments of the present disclosure, the timing controller 30 is further configured to provide a data signal of a display row of the display panel, and the data signal of the display row provided at the first moment is different from the data signal of the display row provided at the second moment, so that pixel rows turned on at the first moment and the second moment respectively receive different data signals (that is, grayscales are different), and therefore, for example, different grayscales can be displayed.

In the embodiments of the present disclosure, the display row may be a pixel row turned on by the gate line. For example, at the first moment, gate lines of the odd-numbered rows of pixel units are sequentially turned on, and the odd-numbered rows are display rows; and at the second moment, gate lines of the even-numbered rows of pixel units are sequentially turned on, and the even-numbered rows are display rows.

In some embodiments of the present disclosure, the data signals of the display rows provided respectively at the first moment and the second moment are complementary to each other.

In the embodiments of the present disclosure, two data signals are complementary to each other, for example, means that the sum of the gray values of the pixel units provided by the two data signals is 255.

For example, at the first moment, the display rows are the odd-numbered rows, and the gray value of each pixel unit in the odd-numbered rows is 255, that is, the odd-numbered rows display a white image; and at the second moment, the display rows are the even-numbered rows, and the gray value of each pixel unit in the even-numbered rows is 0, that is, the even-numbered rows display a black image. In this way, the previous display image and the next display image (the white image and the black image) can form a frame of image with black alternating with white.

In some embodiments of the present disclosure, as illustrated in FIG. 1B, the plurality of initial clock signal output terminals 301 of the timing controller 30 include a first output terminal group 311 and a second output terminal group 321. The first output terminal group 311 provides a first portion of the plurality of first clock signals to the first conversion unit 11, and the second output terminal group 321 provides a second portion of the plurality of first clock signals to the second conversion unit 12. For example, as illustrated in FIG. 1B, the plurality of first clock signals include CLK1_IN, CLK2_IN, CLK3_IN, and CLK4_IN, the first output terminal group 311 provides the first portion of the plurality of first clock signals to the first conversion unit 11, such as CLK1_IN and CLK2_IN, and the second output terminal group 321 provides the second portion of the plurality of first clock signals to the second conversion unit 12, such as CLK3_IN and CLK4_IN.

For example, at the first moment, the first output terminal group 311 of the timing controller 30 provides the clock signals CLK1_IN and CLK2_IN to the first portion of the first clock signal input terminals, and the second output terminal group 321 provides a low-level signal to the second portion of the first clock signal input terminals. At the second moment, the first output terminal group 311 of the timing controller 30 provides a low-level signal to the first portion of the first clock signal input terminals, and the second output terminal group 321 provides the clock signals CLK3_IN and CLK4_IN to the second portion of the first clock signal input terminals.

In some embodiments of the present disclosure, as illustrated in FIG. 1B, the level conversion unit 10 outputs at least one clock signal at the first moment by the first portion 1021 of the plurality of first clock signal output terminals 102, so that the first portion of the first output signals is at least one clock signal, and the second portion 1022 of the plurality of first clock signal output terminals 102 outputs a non-trigger signal.

For example, the non-trigger signal is a horizontal voltage signal, for example, the level of the horizontal voltage signal is a low level in a clock signal (a square wave signal).

For example, at the first moment, the first portion (for example, the first output signal CLK1, the first output signal CLK3, the first output signal CLK5, the first output signal CLK7, and the first output signal CLK9 in FIG. 1B) of the first output signals is a plurality of clock signals, and the first portion 211 of the plurality of second clock signal input terminals 201 receives the plurality of clock signals, so that the first portion 212 of the 2n gate signal output terminals 202 sequentially shifts and outputs a plurality of first gate scan signals in response to the plurality of clock signals. The plurality of first gate scan signals can control the gate lines of the pixel rows (e.g., the odd-numbered rows) corresponding to the first portion 212 of the 2n gate signal output terminals 202 in the display panel to be sequentially turned on. When the gate lines are sequentially turned on, data lines provide data signals to the pixel units in the corresponding rows in the pixel array, so as to form grayscale voltages that are required for the gray-scales of the display image in various pixel units, thereby displaying a frame of an image.

For example, at the first moment, the second portion 1022 of the plurality of first clock signal output terminals 102 outputs a non-trigger signal, so that the second portion 221 of the plurality of second clock signal input terminals 201 receives the non-trigger signal, and the second portion 222 of the 2n gate signal output terminals 202 outputs the non-trigger signal, so that the gate lines of the pixel rows (for example, the even-numbered rows) corresponding to the second portion 222 of the 2n gate signal output terminals 202 in the display panel are in a turned-off state.

Therefore, at the first moment, pixel units of the pixel rows corresponding to the first portion 212 of the 2n gate signal output terminals 202 in the pixel array form the grayscale voltages that are required by various grayscales of the display image to display the image, and pixel units of the pixel rows corresponding to the second portion 222 of the 2n gate signal output terminals 202 cannot be charged to write new data signals because the gate lines of the pixel rows corresponding to the second portion 222 are in the turned-off state, so that the data signals written before the first moment are maintained.

Similarly, at the second moment, the second portion (for example, the first output signal CLK2, the first output signal CLK4, the first output signal CLK6, the first output signal CLK8, and the first output signal CLK10 in FIG. 1B) of the first output signal is a plurality of clock signals, and the second portion 221 of the plurality of second clock signal input terminals 201 receives the plurality of clock signals, so that the second portion 222 of the 2n gate signal output terminals 222 sequentially shifts and outputs a plurality of second gate scan signals in response to the plurality of clock signals. The plurality of second gate scan signals can control the gate lines of the pixel rows (e.g., the even-numbered rows) corresponding to the second portions 222 of the 2n gate signal output terminals 202 in the display panel to be sequentially turned on. When the gate lines are sequentially turned on, data lines provide data signals to the pixel units in the corresponding rows in the pixel array, so as to form grayscale voltages that are required for the grayscales of the display image in the pixel units, thereby displaying a frame of an image.

In some embodiments of the present disclosure, at the second moment, the first portion 1021 of the plurality of first clock signal output terminals 102 outputs a non-trigger signal, so that the first portion 211 of the plurality of second clock signal input terminals 201 receives the non-trigger signal, and the first portion 212 of the 2n gate signal output terminals 202 outputs the non-trigger signal, so that the gate lines of the pixel rows (e.g., the odd-numbered rows) corresponding to the first portion 212 of the 2n gate signal output terminals 202 in the display panel are in the turned-off state.

Therefore, at the second moment, the pixel units of the pixel rows corresponding to the second portion 222 of the 2n gate signal output terminals 202 in the pixel array form the grayscale voltages required by various grayscales of the display image to display the image, and the pixel units of the pixel rows corresponding to the first portion 212 of the 2n gate signal output terminals 202 maintain data signals that are written at the first moment because the gate lines are in the turned-off state.

In some embodiments of the present disclosure, the first portion 212 of the 2n gate signal output terminals are output terminals with odd-number, and the second portion 222 of the 2n gate signal output terminals is output terminals with even-number. For example, the first portion 212 of the 2n gate signal output terminals are output terminals with sequence numbers of 1, 3, 5 . . . 2n−1 (n is an integer greater than or equal to 1). For example, gate signal output terminals with sequence numbers of 1, 3, 5 . . . 2n−1 are respectively connected to gate lines with sequence numbers of 1, 3, 5 . . . 2n−1 in the display panel. Similarly, for example, the second portion 222 of the 2n gate signal output terminals are output terminals with sequence numbers of 2, 4, 6 . . . 2n (n is an integer greater than or equal to 1), and gate signal output terminals with sequence numbers of 2, 4, 6 . . . 2n are respectively connected to gate lines with sequence numbers of 2, 4, 6 . . . 2n in the display panel.

For example, as illustrated in FIG. 1B, for example, the first clock signal output terminals with the odd-number sequence numbers served as a group (i.e., the first portion) provide the first portion (e.g., the clock signal CLK1, the clock signal CLK3, the clock signal CLK5, the clock signal CLK7, and the clock signal CLK9) of the plurality of first output signals to the first portion 211 of the second clock signal input terminals at the first moment, and the first clock signal output terminals with the even-number sequence numbers served as a group (i.e., the second portion) provide the non-trigger signal to the second portion 221 of the second clock signal input terminals, so that the first portion 212 of the 2n gate signal output terminal 202 outputs the first gate scan signals, and the second portion 222 of the 2n gate signal output terminal outputs the non-trigger signal. For example, in the present embodiment, the gate signal output terminals with the sequence numbers of 1, 3, 5 . . . 2n−1 are respectively connected to the gate lines with the sequence numbers of 1, 3, 5 . . . 2n−1 in the display panel, so that gate lines with odd-number sequence numbers in the display panel are turned on, and gate lines with even-number sequence numbers are turned off, so that the data signals can be written into the pixel units in odd-numbered rows, and cannot be written into pixel units in even-numbered rows. The first clock signal output terminals with the even-number sequence numbers served as a group provides the second portion (e.g., the clock signal CLK2, the clock signal CLK4, the clock signal CLK6, the clock signal CLK8, and the clock signal CLK10) of the plurality of first output signals to the second portion 221 of the second clock signal input terminals at the second moment, and the first clock signal output terminals with the odd-number sequence numbers served as a group provide the non-trigger signal to the first portion 211 of the second clock signal input terminals, so that the second portion 222 of the 2n gate signal output terminals 202 outputs the second gate scan signals, so that the second portion 222 of the 2n gate signal output terminals 202 outputs second gate scan signals, and the first portion 212 of the 2n gate signal output terminals 202 outputs non-trigger signals. In the present embodiment, the gate signal output terminals with the sequence numbers of 2, 4, 6 . . . 2n are respectively connected to the gate lines with the sequence numbers of 2, 4, 6 . . . 2n in the display panel, so that the data signals can be written into the pixel units in even-numbered rows and cannot be written into the pixel units in odd-numbered rows.

In the above-mentioned embodiment, the first clock signal output terminals are grouped according to odd-number and even-number, and a first clock signal output terminal of odd-number and a first clock signal output terminal of even-number are respectively provide gate scan signals to a gate line of an odd-numbered row and an gate line of an even-numbered row, but this is only an embodiment of the present disclosure, which does not have a limiting effect on the present disclosure. For example, in some other embodiments of the present disclosure, the first clock signal output terminals are grouped in a way of two as a group, that is, two adjacent first clock signal output terminals are taken as a whole, a plurality of wholes are numbered, a plurality of wholes with odd-numbers are served as a group, and a plurality of wholes with even-numbers are served as a group. For example, the output terminals with sequence numbers of 1 and 2, sequence numbers of 5 and 6, sequence numbers of 9 and 10 are a group, and the output terminals with sequence numbers of 3 and 4, sequence numbers of 7 and 8, sequence numbers of 11 and 12 are a group, so that the gate lines of the first row, the second row, the fifth row, the sixth row, the ninth row and the tenth row are sequentially turned on at the firs moment, and the gate lines of the third row, the fourth row, the seventh row, the eighth row, the eleventh row and the twelfth row are sequentially turned on at the second moment. For another example, three adjacent first clock signal output terminals are served as a whole, a plurality of wholes are numbered, a plurality of wholes with odd-numbers are served as a group, and a plurality of wholes with even-numbers are served as a group.

In some embodiments of the present disclosure, the amount of the plurality of first clock signal input terminals 101 is less than or equal to the amount of the plurality of first clock signal output terminals 102. For example, as illustrated in FIG. 1B, the level conversion unit 10 in the driving circuit 100 includes four first clock signal input terminals and ten first clock signal output terminals.

In some embodiments of the present disclosure, the level conversion unit 10 further includes a control signal receiving terminal and a control signal output terminal. As illustrated in FIG. 1B, the control signal receiving terminal includes a first receiving terminal 104 and a second receiving terminal 103, and the control signal output terminal includes a first output terminal 106 and a second output terminal 105. The first receiving terminal 104 is configured to receive a frame start signal STV1, and the first output terminal 106 is configured to provide the frame start signal STV1 to the gate electrode driving unit 20, so that the gate electrode driving unit starts to shift and output a gate scan signal in response to the frame start signal STV1. The second receiving terminal 103 is configured to receive a reset signal STV0, and the second output terminal 105 is configured to provide the reset signal STV0 to the gate electrode driving unit 20, so that the gate electrode driving unit 20 performs resetting in response to the reset signal STV0.

The driving circuit of the present disclosure is further described below with reference to three embodiments illustrated in FIG. 2A, FIG. 2B and FIG. 2C.

Figure 2A:
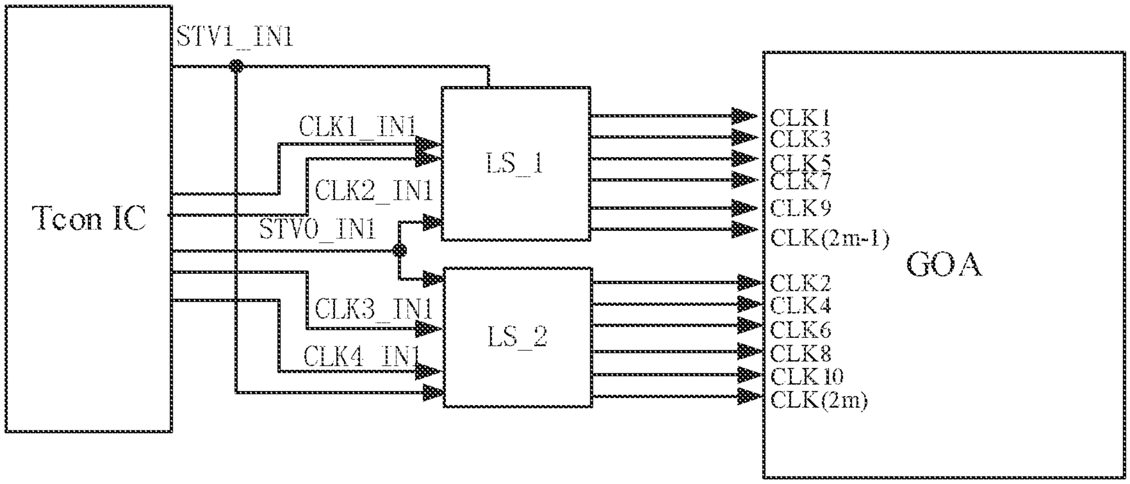
FIG. 2A schematically illustrates a schematic diagram of a driving circuit provided by at least one embodiment of the present disclosure.

FIG. 2A schematically illustrates a schematic diagram of a driving circuit provided by at least one embodiment of the present disclosure.

As illustrated in FIG. 2A, in the present embodiment, the driving circuit 200 includes a first conversion unit LS_1, a second conversion unit LS_2, a timing controller Tcon IC, and a gate electrode driving unit GOA. The first conversion unit LS_1 and the second conversion unit LS_2 are components of the level conversion unit in the driving circuit 200, that is, the level conversion unit in the driving circuit 200 includes the first conversion unit LS_1 and the second conversion unit LS_2, and the first conversion unit LS_1 and the second conversion unit LS_2 are respectively on two different chips. Hereinafter, the first conversion unit LS_1 and the second conversion unit LS_2 are simply referred to as "two conversion chips".

As illustrated in FIG. 2A, the amount of the first clock signal input terminals of the first conversion unit LS_1 is less than the amount of the first clock signal output terminals of the first conversion unit LS_1, and the amount of the first clock signal input terminals of the second conversion units LS_2 is less than the amount of the first clock signal output terminals of the second conversion units LS_2. Therefore, in the present embodiment, the amount of the first clock signal input terminals in the level conversion unit is less than the amount of the first clock signal output terminals in the level conversion unit.

In the present embodiment, for example, the timing controller Tcon IC outputs a reset signal STV0_IN1, a frame start signal STV1_IN1 and a plurality of first clock signals CLK1_IN1-CLK4_IN1 to the two conversion chips. The Tcon IC groups CLK1_IN1-CLK4_IN1, the first clock signals CLK1_IN1 and CLK2_IN1 are a first output terminal group, and the first clock signals CLK3_IN1 and CLK4_IN1 are a second output terminal group.

For example, the reset signal STV0_IN1, the frame start signal STV1_IN1, and the first clock signals CLK1_IN1-CLK2_IN1 are provided to the first conversion unit LS_1 to generate STV0_IN1, STV1_IN1, and a first portion CLK (2m−1) (m>=1) of the first output signals (e.g., m=4, and the first portion of the first output signals include a first output signal CLK1, a first output signal CLK3, a first output signal CLK5, a first output signal CLK7, a the first output signal CLK9) by the first conversion unit LS_1. The reset signal STV0_IN1, the frame start signal STV1_IN1, and the first clock signals CLK3_IN1-CLK4_IN1 are provided to the second conversion unit LS_2 to generate STV0_IN1, STV1_IN1, and a second portion CLK(2m) of the first output signals (e.g., m=4, and the second portion of the first output signals include a first output signal CLK2, a first output signal CLK4, a first output signal CLK6, a first output signal CLK8, and a first output signal CLK10) by the second conversion unit LS_2. In some embodiments of the present disclosure (e.g., examples of FIG. 2A-FIG. 2C), for example, the value of m is determined based on the amount of clock signals used by the GOA unit. For example, the amount of clock signals used by the GOA unit is 12, so that m=6, for another example, the amount of clock signals used by the GOA unit is 8, so that m=4. Those skilled in the art may determine the value of m based on the amount of clock signals used by the GOA.

For example, when the timing controller Tcon IC receives and detects data of a frame with a black row alternating with a white row (hereinafter referred to as "H1 black alternating with white"), a mode detection function is started. Under the mode detection function, the timing controller Tcon IC normally outputs the reset signal STV0_IN1 and the frame start signal STV1_IN1. In the case where of the first frame, the Tcon IC normally outputs the clock signals CLK1_IN1 and CLK2_IN1, and CLK3_IN1 and CLK4_IN1 maintain low levels. At this time, the first conversion unit LS_1 controls the first portion of the first clock signal output terminals to normally output clock signals CLK1, CLK3, CLK5 . . . CLK(2m−1), and the second conversion unit LS_2 controls the second portion of the first clock signal output terminals to output low levels (i.e., non-trigger signals). At this time, for example, the first portion of the 2n gate signal output terminals corresponding to the first portion of the first output signals drive odd-numbered rows of gate lines in the display panel to be turned on and charges odd-numbered rows of pixel units, the timing controller Tcon IC sends and drives the pixel units to receive data with a grayscale value of 255, the display panel displays a white image with a grayscale value of 255, even-numbered rows of gate lines are not turned on, and a previous frame before the frame of H1 black alternating with white is displayed.

In the case where of the second frame, the timing controller Tcon IC normally outputs CLK3_IN1 and CLK4_IN1, and CLK1_IN1 and CLK2_IN1 are reduced to low levels and maintained. At this time, the second conversion unit LS_2 controls the second portion of the first clock signal output terminals to normally output clock signals CLK2, CLK4, and CLK6, . . . , and CLK(2m), and the first conversion unit LS_1 controls the first portion of the first clock signal output terminals to output low levels (i.e., non-trigger signals). At this time, for example, the second portion of the 2n gate signal output terminals corresponding to the second portion of the first output signals drive the even-numbered rows of gate lines in the display panel to turn on and charges the even-numbered rows of pixel units. The timing controller Tcon IC sends and drives the pixel units to receive data with a grayscale value of 0, the display panel displays a black image with a grayscale value of 0, and because clock signals of odd-numbered rows maintain low levels, the odd-numbered rows of gate lines are turned off, and the odd-numbered rows maintain the white image with the grayscale value of 255 of the previous frame.

The previous image and the following image are combined to display a frame of H1 black alternating with white, and cyclic display is repeated, so that correct display of the frame of H1 black alternating with white is achieved by the mode detection function.

Figure 2B:
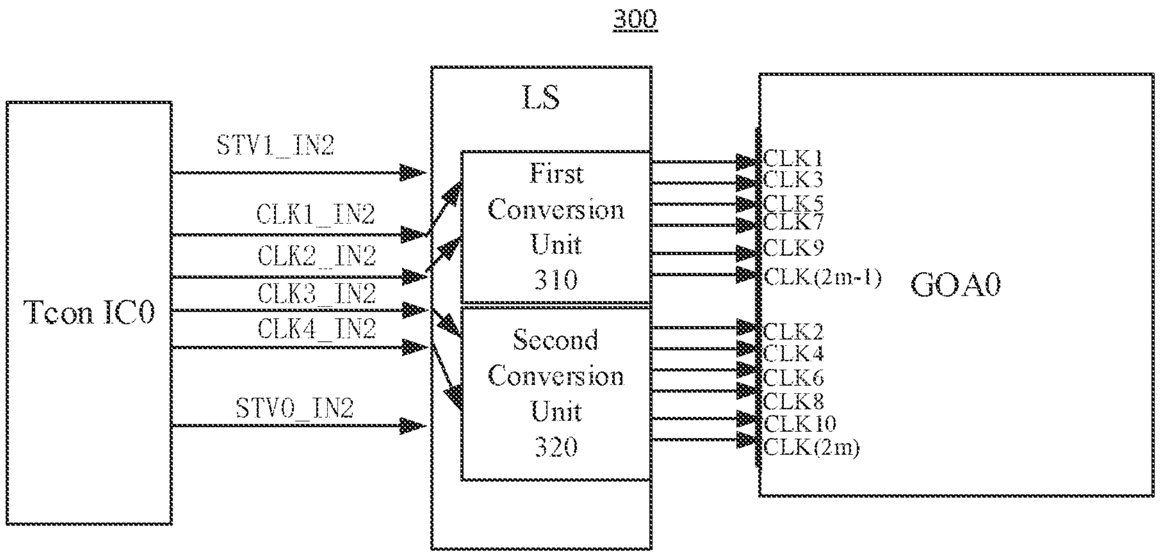
FIG. 2B schematically illustrates a schematic diagram of another driving circuit provided by at least one embodiment of the present disclosure.

FIG. 2B schematically illustrates a schematic diagram of another driving circuit provided by at least one embodiment of the present disclosure.

As illustrated in FIG. 2B, in the present embodiment, the driving circuit 300 includes a level conversion unit LS, a timing controller Tcon IC0 and a gate electrode driving unit GOA0. The level conversion unit LS includes a first conversion unit 310 and a second conversion unit 320, that is, in the present embodiment, the first conversion unit 310 and the second conversion unit 320 are integrated on the same chip.

As illustrated in FIG. 2B, the amount (that is 4) of the first clock signal input terminals in the level conversion unit is less than the amount (e.g., 10, 12, etc.) of the first clock signal output terminals.

In the present embodiment, for example, the timing controller Tcon IC0 outputs a reset signal STV0_IN2, a frame start signal STV1_IN2 and a plurality of first clock signals CLK1_IN2-CLK4_IN2 to the level conversion unit LS. Tcon IC0 groups CLK1_IN2-CLK4_IN2, CLK1_IN2 and CLK2_IN2 are a first output terminal group, and CLK3_IN2 and CLK4_IN2 are a second output terminal group. The signals CLK1_IN2 and CLK2_IN2 in the first output terminal group are served as inputs of the first conversion unit 310, and the signals CLK3_IN2 and CLK4_IN2 in the second output terminal group are served as inputs of the second conversion unit 320.

The signals CLK1_IN2-CLK2_IN2 in the first output terminal group control the level conversion unit LS to output the first portion of the first output signals. For example, at a first moment, a first portion of the first output signals include clock signals CLK1, CLK3, CLK5, . . . , and CLK(2m−1) (m>=1). The signals CLK3_IN2-CLK4_IN2 in the second output terminal group control the level conversion unit LS to output the second portion of the first output signals. For example, at a second moment, the second portion of the first output signal include clock signals CLK2, CLK4, CLK6, . . . , and CLK(2m).

For example, when the timing controller Tcon IC0 receives and detects data of a frame of H1 black alternating with white, a mode detection function is started. Under the mode detection function, the timing controller Tcon IC0 normally outputs the reset signal STV0_IN2 and the frame start signal STV1_IN2. In the case where of the first frame, the Tcon IC0 normally outputs the clock signals CLK1_IN2 and CLK2_IN2, and the clock signals CLK3_IN2 and CLK4_IN2 maintain low levels. At this time, the level conversion unit LS receives the clock signals CLK1_IN2 and CLK2_IN2 and controls the first portion of the plurality of first clock signal output terminals to normally output clock signals CLK1, CLK3, CLK5, . . . , and CLK(2m−1), and the level conversion unit LS receives the clock signals CLK3_IN2 and CLK4_IN2 and controls the second portion of the plurality of first clock signal output terminals to output low levels. At this time, the GOA0 drives odd-numbered rows of gate lines in the display panel to be turned on and charges odd-numbered rows of pixel units, the timing controller Tcon IC0 sends and drives the pixel units to receive data with a grayscale value of 255, the display panel displays a white image with a grayscale value of 255, clock signals of the even-numbered rows are low levels, so even-numbered rows of gate lines are not turned on, and a previous frame before the frame of H1 black alternating with white is displayed.

In the case where of the second frame, the timing controller Tcon IC0 normally outputs the clock signals CLK3_IN2 and CLK4_IN2, and CLK1_IN2 and CLK2_IN2 are reduced to low levels and maintained. At this time, the level conversion unit LS receives the clock signals CLK3_IN2 and CLK4_IN2, and controls the second portion of the first clock signal output terminals to normally output clock signals CLK2, CLK4, and CLK6, . . . , and CLK(2m), the first conversion unit LS receives CLK1_IN2 and CLK_IN2, and controls the first portion of the first clock signal output terminals to output a low level. At this time, GOA0 drives the even-numbered rows of gate lines in the display panel to be turned on and charges the even-numbered rows of pixel units. The timing controller Tcon IC0 sends and drives the pixel units to receive data with a grayscale value of 0, the display panel displays a black image with a grayscale value of 0, and because clock signals of odd-numbered rows maintain low levels, the odd-number rows of gate lines are turned off, and the odd-numbered rows maintain the white image with the grayscale value of 255 of the previous frame.

The previous frame image and the next frame image are combined to display a frame of H1 black alternating with white, and cyclic display is repeated, so that correct display of the frame of H1 black alternating with white image is achieved by the mode detection function.

Figure 2C:
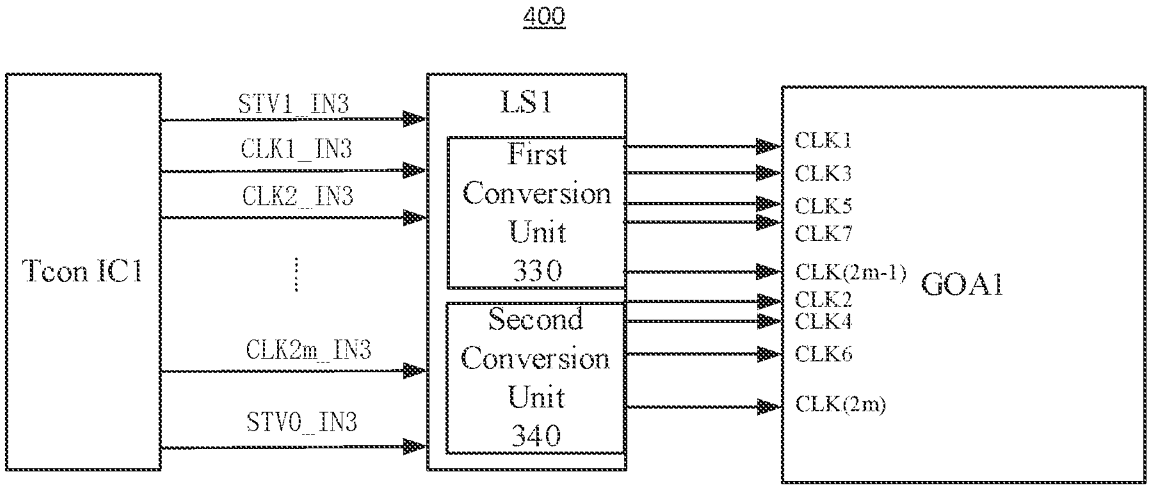
FIG. 2C schematically illustrates a schematic diagram of another driving circuit provided by at least one embodiment of the present disclosure.

FIG. 2C schematically illustrates a schematic diagram of another driving circuit provided by at least one embodiment of the present disclosure.

As illustrated in FIG. 2C, in the present embodiment, the driving circuit 400 includes a level conversion unit LS1, a timing controller Tcon IC1 and a gate electrode driving unit GOA1. The level conversion unit LS1 include a first conversion unit 330 and a second conversion unit 340, that is, in the present embodiment, the first conversion unit 330 and the second conversion unit 340 are integrated on the same chip.

As illustrated in FIG. 2C, in this example, the amount of the first clock signal input terminals in the level conversion unit LS1 is equal to the amount of the first clock signal output terminals in the level conversion unit LS1, and the amount equal to 2m (m>=1). In this example, the amount of channels of clock signals that Tcon IC1 outputs to LS1 is the same as the amount of channels of clock signals that LS1 outputs to GOA1. Tcon IC1 groups the clock signals, CLK1_IN3, CLK3_IN3, CLK5_IN3, . . . , and CLK(2m−1)_IN3 are a first output terminal group, and CLK2_IN3, CLK4_IN3, CLK6_IN3, . . . , and CLK(2m)_IN3 are a second output terminal group.

The first output terminal group CLK1_IN3, CLK3_IN3, CLK5_IN3, . . . , and CLK(2m−1)_IN3 control the level conversion unit LS1 to output the first portion CLK1, CLK3, CLK5, . . . , and CLK(2m−1)(m>=1) of the first output signals. The second output terminal group CLK2_IN3, CLK4_IN3, CLK6_IN3, . . . , and CLK(2m)_IN3 control the level conversion unit LS1 to output the second portion CLK2, CLK4, CLK6, . . . , and CLK(2m) of the first output signals.

For example, when the timing controller Tcon IC1 receives and detects data of a frame of H1 black alternating with white, a mode detection function is started. Under the mode detection function, the timing controller Tcon IC1 normally outputs a reset signal STV0_IN3 and a frame start signal STV1_IN3. In the case where of the first frame, the Tcon IC1 normally outputs the clock signals CLK1_IN3, CLK3_IN3, CLK5_IN3, . . . , and CLK(2m−1)_IN3, and the clock signals CLK2_IN3, CLK4_IN3, CLK6_IN3, . . . , and CLK(2m)_IN3 maintain low levels. The level conversion unit LS1 receives the above-mentioned clock signals CLK1_IN3, CLK3_IN3, CLK5_IN3, . . . , and CLK(2m−1)_IN3 and outputs these clock signals after performing boosting, the first portion of the first output signals normally output the clock signals CLK1, CLK3, CLK5, . . . , and CLK(2m−1), and the second portion of the first output signals output low levels. At this time, the GOAL drives odd-numbered rows of gate lines in the display panel to be turned on and charges odd-numbered rows of pixel units, the timing controller Tcon IC1 sends and drives the pixel units to receive data with a grayscale value of 255, the display panel displays a white image with a grayscale value of 255, even-numbered rows of gate lines are not turned on, and a previous frame before the frame of H1 black alternating with white is displayed.

In the case where of the second frame, the timing controller Tcon IC1 normally outputs the clock signals CLK2_IN3, CLK4_IN3, CLK6_IN3, . . . , and CLK(2m)_IN3, and the clock signals CLK1_IN3, CLK3_IN3, CLK5_IN3, . . . , and CLK(2m−1)_IN3 maintain low levels. The level conversion unit LS1 receives the above-mentioned clock signals CLK2_IN3, CLK4_IN3, CLK6_IN3, . . . , and CLK(2m)_IN3 and outputs these clock signals after performing boosting, the second portion of the first clock signal output terminals normally output the clock signals CLK2, CLK4, and CLK6, . . . , and CLK(2m), and the first portion of the first clock signal output terminals output low levels. At this time, GOAL drives the even-numbered rows of gate lines in the display panel to be turned on and charges the even-numbered rows of pixel units. The timing controller Tcon IC1 sends and drives the pixel units to receive data with a grayscale value of 0, the display panel displays a black image with a grayscale value of 0, and because clock signals of odd-numbered rows maintain low levels, the odd-numbered rows of gate lines are turned off, and the odd-numbered rows maintain the white image with the grayscale value of 255 of the previous frame.

The previous frame image and the next frame image are combined to display a frame of H1 black alternating with white, and cyclic display is repeated, so that correct display of the frame of H1 black alternating with white is achieved by the mode detection function.

Figure 3A:
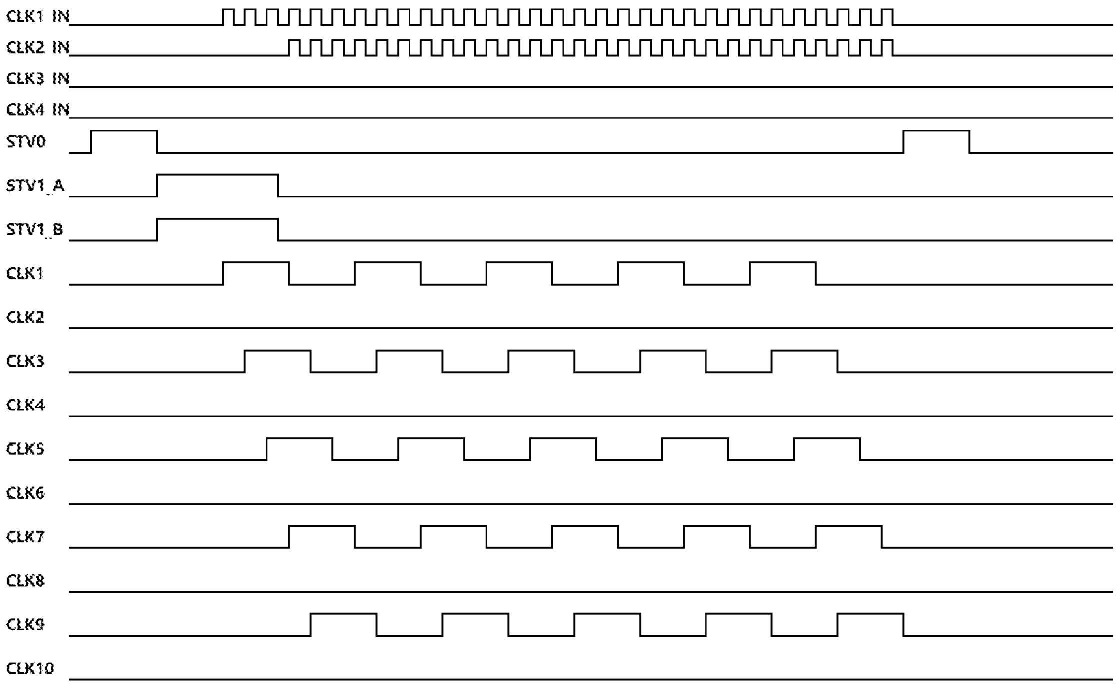
FIG. 3A and FIG. 3B schematically illustrate timing diagrams of a gate electrode driving unit, in the case where an image of H1 black alternating with white is displayed, provided by at least one embodiment of the present disclosure.
Figure 3B:
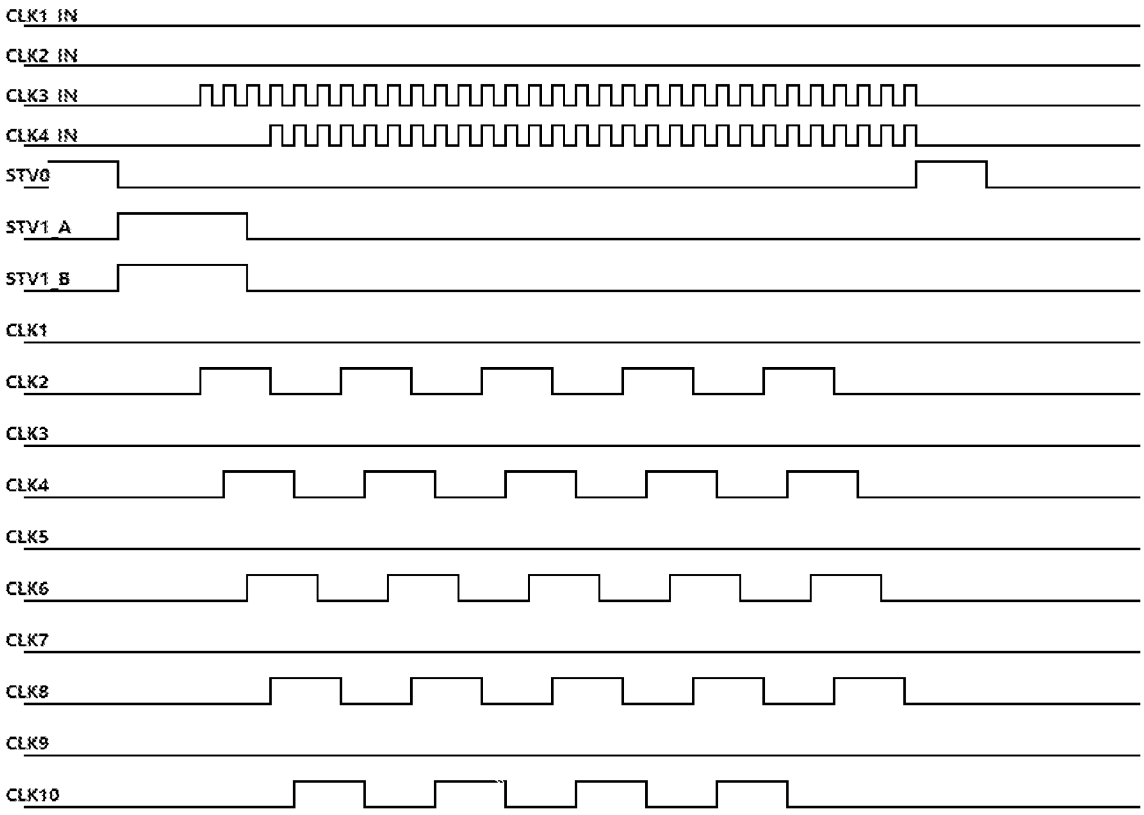

FIG. 3A and FIG. 3B schematically illustrate timing diagrams of a gate electrode driving unit, in the case where an H1 black alternating with white image is displayed, provided by at least one embodiment of the present disclosure.

FIG. 3A is a timing diagram in the case where a first image (e.g., a white image) is displayed by odd-numbered rows in a display panel at a first moment; and FIG. 3B is a timing diagram in the case where a second image (e.g., a black image) is displayed by even-numbered rows in the display panel at a second moment.

The timing diagrams illustrated in FIG. 3A and FIG. 3B may be applied to any one of embodiments of FIG. 2A-FIG. 2C. In the examples of FIG. 3A and FIG. 3B, the above-mentioned m is equal to 5. In FIG. 3A and FIG. 3B, CLK1_IN, CLK2_IN, CLK3_IN1 and CLK4_IN1 respectively represent CLK1_IN1, CLK2_IN1, CLK3_IN1 and CLK4_IN1 in FIG. 2A, or CLK1_IN2, CLK2_IN2, CLK3_IN2, and CLK4_IN2 in FIG. 2B, or CLK1_IN3, CLK2_IN3, CLK3_IN3, and CLK4_IN3 in FIG. 2C. STV0 represents a reset signal, STV1_A and STV1_B both represent frame start signals. For example, STV1_A is a frame start signal that is input to shift register units in odd-numbered rows in the gate electrode driving unit, and STV1_B is a frame start signal that is input to shift register units of even-numbered rows in the gate electrode driving unit. It should be understood that the frame start signal STV1_A and the frame start signal STV1_B may be the same signal, and here, STV1_A and STV1_B are labeled differently to conveniently distinguish the odd-numbered group and the even-numbered group.

As illustrated in FIG. 3A, at the first moment, the timing controller (e.g., Tcon IC) normally outputs CLK1_IN and CLK2_IN, and CLK3_IN and CLK4_IN maintain low levels.

The level conversion unit converts CLK1_IN and CLK2_IN outputted by the timing controller into level signals described above, and outputs the clock signals by the first portion of the first clock signal output terminals (e.g., the first clock signal output terminals of the odd-number sequence numbers), so that the first portion of the 2n gate signal output terminals of the gate electrode driving unit (e.g., the output terminals of the odd-number sequence numbers) outputs at least one clock signal. As illustrated in FIG. 3A, the output terminals of odd-number sequence numbers in the gate electrode driving unit sequentially output CLK1, CLK3, CLK 5, CLK7, and CLK9.

Because CLK3_IN and CLK4_IN maintain low levels, the second portion of the first clock signal output terminals (e.g., the first clock signal output terminals of the even-number sequence numbers) outputs low-level signals, so that the second portion of the 2n gate signal output terminals of the gate electrode driving unit (e.g., the output terminals of the even-number sequence numbers) output non-trigger signals (e.g., low-level signals).

As illustrated in FIG. 3A, CLK2, CLK4, CLK6, CLK8, and CLK10 output by the output terminals of even-number sequence numbers in the gate electrode driving unit are all low levels.

In the embodiments of the present disclosure, there is no necessary connection between the timing of CLK1_IN and the timing of CLK2_IN, and those skilled in the art may design the timing of CLK1_IN and the timing of CLK2_IN to control and generate clock signals CLK1, CLK3, CLK 5, CLK7, and CLK9. For example, in the embodiment illustrated in FIG. 3A, the following clock signal among CLK1, CLK3, CLK5, CLK7, and CLK 9 is later than the previous clock signal by one clock cycle of CLK1_IN or CLK2_IN. The clock cycles of CLK1, CLK3, CLK5, CLK7, and CLK9 are all three times the clock cycle of CLK1_IN or CLK2_IN.

As illustrated in FIG. 3B, at the second time, the timing controller (e.g., Tcon IC) normally outputs CLK3_IN and CLK4_IN, and CLK1_IN and CLK2_IN maintain low levels. Similarly, in the embodiments of the present disclosure, there is no necessary connection between the timing of CLK3_IN and the timing of CLK4_IN, and those skilled in the art may design the timing of CLK3_IN and the timing of CLK4_IN to control and generate clock signals CLK2, CLK4, CLK 6, CLK8, and CLK10.

The level conversion unit converts the CLK3_IN and CLK4_IN outputted by the timing controller into the level signals described above, and outputs the clock signals by the second portion of the first clock signal output terminals (for example, the first clock signal output terminals of the even-number sequence numbers), so that the second portion of the 2n gate signal output terminals of the gate electrode driving unit (for example, the output terminals of the even-number sequence number) output at least one clock signal. As illustrated in FIG. 3B, the output terminals of odd-number sequence numbers in the gate electrode driving unit sequentially output clock signals CLK2, CLK4, CLK6, CLK8, and CLK10.

Because CLK1_IN and CLK2_IN maintain low levels, the first portion of the first clock signal output terminals (e.g., the first clock signal output terminals of the odd-number sequence numbers) output low-level signals, so that the first portion of the 2n gate signal output terminals of the gate electrode driving unit (e.g., the output terminals of the odd-number sequence numbers) output non-trigger signals (e.g., low-level signals). As illustrated in FIG. 3B, CLK1, CLK3, CLK5, CLK7, and CLK9 output by the output terminals of odd-number sequence numbers in the gate electrode driving unit are all low levels.

FIG. 4A illustrates a schematic structural diagram of a gate electrode driving unit provided by at least one embodiment of the present disclosure.

As illustrated in FIG. 4A, the gate electrode driving unit includes a plurality of cascaded shift register units (for example, GOA1-GOA5).

For example, as illustrated in FIG. 4A, the gate electrode driving unit is coupled to a clock signal line CK1', a clock signal line CK2', a clock signal line CK3', and a clock signal line CK4'. For example, the clock signal line CK1' is connected to a clock signal terminal of the (4n−3)-th (n is an integer greater than 0) stage shift register unit; the clock signal line CK2' is connected to a clock signal terminal of the (4n−2)-th stage shift register unit; the clock signal line CK3' is connected to a clock signal terminal of the (4n−1)-th stage shift register unit; and the clock signal line CK4' is connected to a clock signal terminal of the (4n)-th stage shift register unit.

In FIG. 4A, one structure of the gate electrode driving unit is illustrated by taking the case where the gate electrode driving unit (i.e., GOA) is coupled to four clock signal lines CK1'-CK4' to drive gate lines in the display panel to be turned on as an example. If the gate electrode driving unit is coupled to the four clock signal lines CK1'-CK4', the level conversion unit may include four first clock signal output terminals, a first portion of the plurality of first clock signal output terminals (e.g., first clock signal output terminals of odd-number sequence numbers) are coupled to the clock signal lines CK1' and CK3' to provide clock signals to the clock signal lines CK1' and CK3', and a second portion of the plurality of first clock signal output terminals (e.g., first clock signal output terminals of even-number sequence numbers) are coupled to the clock signal lines CK2' and CK4' to provide clock signals to the clock signal lines CK2' and CK4'.

For example, an input terminal INPUT of the first stage shift register unit is configured to receive a frame start signal STV1, a reset terminal RST of the last stage shift register unit is configured to receive a reset signal STV0, and the frame start signal STV1 and the reset signal STV0 are not illustrated in FIG. 4A.

For example, as illustrated in FIG. 4A, a reset terminal of each stage of shift register units is connected to an output terminal of a next-stage shift register unit that space one stage apart from the each stage, an input terminal of the each stage of shift register units is connected to an output terminal of a previous-stage shift register unit that space one stage apart from the each stage, so that a plurality of cascaded shift register units of the gate electrode driving unit are divided into two groups, and a plurality of shift register units separated by one stage are one group. For example, the shift register units with odd-number sequence numbers are a group, and the shift register units with even-number sequence numbers are a group.

FIG. 4B illustrates a schematic structural diagram of a gate electrode driving unit provided by at least one embodiment of the present disclosure.

In FIG. 4B, one structure of the gate electrode driving unit is illustrated by taking the case where the gate electrode driving unit (i.e., GOA) is coupled to four clock signal lines CK1-CK4 to drive gate lines in the display panel to be turned on as an example. If the gate electrode driving unit is coupled to the four clock signal lines CK1-CK4, the level conversion unit may include four first clock signal output terminals, a first portion of the plurality of first clock signal output terminals (e.g., first clock signal output terminals of odd-number sequence numbers) are coupled to the clock signal lines CK1 and CK3 to provide clock signals to the clock signal lines CK1 and CK3, and a second portion of the plurality of first clock signal output terminals (e.g., first clock signal output terminals of even-number sequence numbers) are coupled to the clock signal lines CK2 and CK4 to provide clock signals to the clock signal lines CK2 and CK4.

As illustrated in FIG. 4B, the gate electrode driving unit is divided into a first shift register unit group 401 and a second shift register unit group 402. For example, the first shift register unit group 401 is configured to provide gate scan signals for odd-numbered rows of gate lines in the display panel, and the second shift register unit group is configured to provide gate scan signals for even-numbered rows of gate lines in the display panel.

As illustrated in FIG. 4B, a first shift register unit in each shift register unit group receives a frame start signal STV1, and each shift register unit in each shift register unit group is coupled to a clock signal line. For example, the first shift register unit group 401 is coupled to the odd-numbered clock signal lines CK1 and CK3, and the second shift register unit group 402 is coupled to the even-numbered clock signal lines CK2 and CK4.

As illustrated in FIG. 4B, in the case where the clock signal line coupled to each shift register unit outputs a high-level square wave, the output of the shift register unit acts on a gate line to turn the gate line, and the output of the shift register unit is also served as an input signal (INPUT) to act on the next shift register unit in the shift register unit group where the shift register unit is from.

Starting from the second shift register unit of each shift register unit group, the next shift register unit receives the INPUT signal provided by the previous shift register unit and outputs a high-level square wave when the respective corresponding clock signal line outputs a high level, the output is not only used to turn on the corresponding gate line, but also to be served as an INPUT signal to act on the next shift register unit, and to be served as a reset signal (RESET) to act on the previous shift register unit. In this way, the driving of the shift register units is finished until the last shift register completes output.

FIG. 4B illustrates a schematic diagram of another gate electrode driving unit according to at least one embodiment of the present disclosure.

The examples in FIG. 4A and FIG. 4B illustrate the grouping control of the gate electrode driving unit by taking the case where the gate electrode driving unit is divided into an odd-number group and an even-number group as an example, but the present disclosure does not limit the grouping of the gate electrode driving unit, and the grouping of the gate electrode driving unit may be designed according to actual requirements.

It should be understood that the structure of the gate electrode driving unit is not limited in the present disclosure, and the gate electrode driving units illustrated in FIG. 4A and FIG. 4B are merely examples, and those skilled in the art may design the structure of the gate electrode driving unit according to actual requirements.

Figure 5:
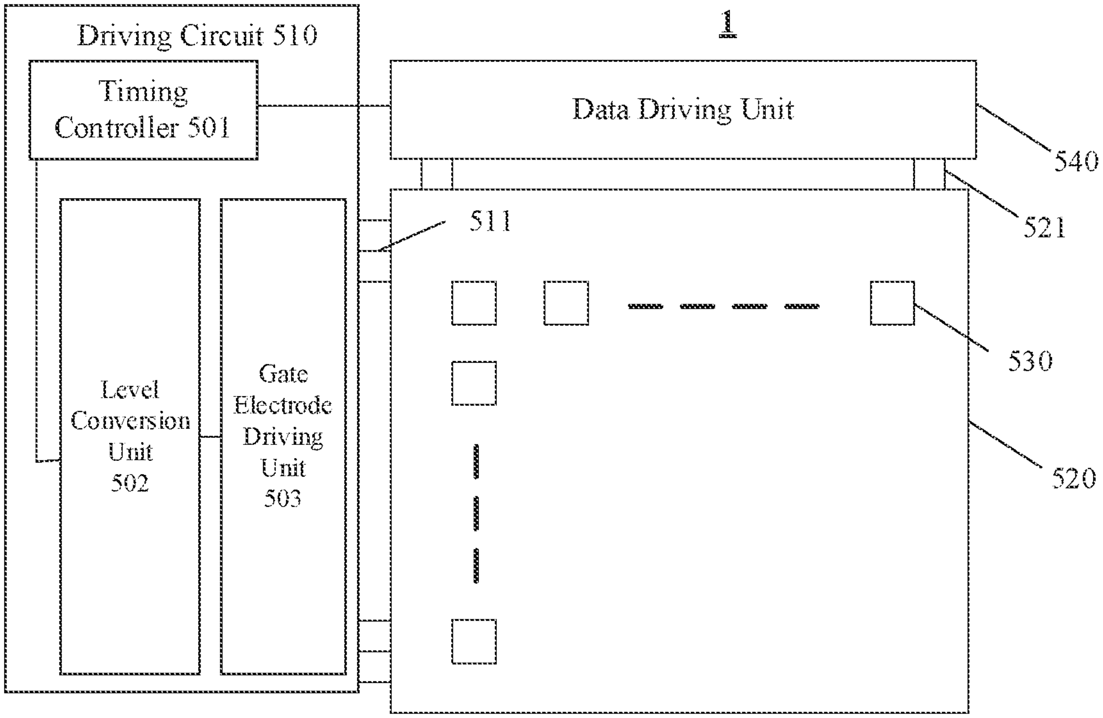
FIG. 5 is a schematic block diagram of a display device provided by at least one embodiment of the present disclosure.

FIG. 5 is a schematic block diagram of a display device provided by at least one embodiment of the present disclosure.

As illustrated in FIG. 5, the display device 1 includes a driving circuit 510 and a display panel 520, and the driving circuit 510 is coupled to the display panel 520. The driving circuit 510 is configured to provide the first gate scan signals and the second gate scan signals to the display panel 520.

The driving circuit 510 may be a driving circuit provided by any one of the embodiments of the present disclosure, and please refer to the above description of the driving circuit. As illustrated in FIG. 5, the driving circuit 510 includes a level conversion unit 502 of any one of the above-mentioned embodiments and a gate electrode driving unit 503 of any one of the above-mentioned embodiments, and the level conversion unit 502 is coupled to the gate electrode driving unit 503. The driving circuit 510 further includes a timing controller 501, and the timing controller 501 is coupled to the level conversion unit 502 to provide a first clock signal to the level conversion unit 502.

The display panel 520 includes an array composed of a plurality of pixel units 530.

For example, the display device 1 further includes a data driving circuit 540. The data driving circuit 540 is configured to provide data signals to the pixel array, and the driving circuit 510 is configured to provide gate scan signals (including the first gate scan signals and the second gate scan signals) to the pixel array. The data driving circuit 540 is electrically connected to the pixel unit 530 through a data line 521, and the driving circuit 510 is electrically connected to the pixel unit 530 through a gate line 511. Specifically, the gate signal output terminal of the gate electrode driving unit 503 in the driving circuit 510 is electrically connected to the pixel unit 530 through the gate line. The data driving unit 540 is coupled to the timing controller 501 to obtain a data signal from the timing controller.

It should be noted that the display device 1 in the present embodiment may be any product or component having a display function, such as a liquid crystal panel, a liquid crystal television, a display, an OLED panel, an OLED television, an electronic paper display device, a mobile phone, a tablet computer, a notebook computer, a digital photo frame, a navigator, etc. The display device 1 may further include other conventional components, and the embodiments of the present disclosure are not limited in this aspect.

The technical effect of the display device 1 provided by the embodiments of the present disclosure may refer to the corresponding description of the driving circuit in the above-mentioned embodiments, and details are not described herein again.

The present disclosure further provides a driving method, and the driving method is applied to the driving circuit provided by any one of the above-mentioned embodiments. The driving method includes: converting the plurality of first clock signals into the plurality of second clock signals in response to the plurality of first clock signal input terminals receiving the plurality of first clock signals, and providing the plurality of first output signals to the plurality of second clock signal input terminals by the plurality of first clock signal output terminals; sequentially shifting and outputting the plurality of first gate scan signals by the first portion of the 2n gate signal output terminals in response to the first portion of the plurality of first output signals received at the first moment by the first portion of the plurality of second clock signal input terminals; and sequentially shifting and outputting the plurality of second gate scan signals by the second portion of the 2n gate signal output terminals in response to the second portion of the plurality of first output signals received at the second moment by the second portion of the plurality of second clock signal input terminals.

For example, in the driving circuit illustrated in FIG. 1B, the plurality of first clock signal input terminals 101 receive the plurality of first clock signals (e.g., the first clock signals CLK1_IN and CLK2_IN) from the timing controller 30, the level conversion unit 10 converts the plurality of first clock signals into the plurality of second clock signals, and the plurality of first clock signal output terminals 102 provide the first output signals to the second clock signal input terminals 201.

In response to the first portion of the first output signals received at the first moment by the first portion 211 of the plurality of second clock signal input terminals 201, the plurality of first gate scan signals are sequentially shifted and output by the first portion 212 of the 2n gate signal output terminals 202; and in response to the second portion of the first output signals received at the second moment by the second portion 221 of the plurality of second clock signal input terminals 201, the plurality of second gate scan signals are sequentially shifted and output by the second portion 212 of the 2n gate signal output terminals 202.

The driving method can alleviate or avoid displaying in a wrong row of the special image or displaying errors of the special image, thereby improving the display quality of the special image.

The following statements should be noted:

(1) The drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A driving circuit, comprising a level conversion unit and a gate electrode driving unit, wherein the level conversion unit comprises a plurality of first clock signal input terminals and a plurality of first clock signal output terminals, and the level conversion unit is configured to convert a plurality of first clock signals received by the plurality of first clock signal input terminals into a plurality of second clock signals and provide a plurality of first output signals to the gate electrode driving unit by the plurality of first clock signal output terminals, respectively;

the gate electrode driving unit comprises a plurality of second clock signal input terminals and 2n gate signal output terminals, the plurality of second clock signal input terminals are configured to receive the plurality of first output signals, and n is an integer greater than or equal to 2; the gate electrode driving unit comprises a plurality of cascaded shift register units, each of the 2n gate signal output terminals is configured to provide a gate scanning signal for one pixel row in a pixel array of a display panel;

the gate electrode driving unit is configured to sequentially shift and output a plurality of first gate scan signals by a first portion of the 2n gate signal output terminals of a first portion of the plurality of cascaded shift register units in response to a first portion of the plurality of first output signals received at a first moment by a first portion of the plurality of second clock signal input terminals, and sequentially output a plurality of second gate scan signals by a second portion of the 2n gate signal output terminals of a second portion of the plurality of cascaded shift register units in response to a second portion of the plurality of first output signals received at a second moment by a second portion of the plurality of second clock signal input terminals; and at the first moment, the first gate scan signals are trigger signals to enable the pixel rows receiving the first gate scan signals to be in an on state, and the second gate scan signals are non-trigger signals to enable the pixel rows receiving the second gate scan signals to be in an off state; at the second moment, the first gate scan signals are non-trigger signals to enable the pixel rows receiving the first gate scan signals to be in an off state, and the second gate scan signals are trigger signals to enable the pixel rows receiving the second gate scan signals to be in an on state.

2. The driving circuit according to claim 1, wherein an amount of the plurality of first clock signal input terminals is less than or equal to an amount of the plurality of first clock signal output terminals.

3. The driving circuit according to claim 2, wherein at the first moment, the level conversion unit outputs at least one clock signal by a first portion of the plurality of first clock signal output terminals, so that the first portion of the plurality of first output signals is at least one clock signal, and a second portion of the plurality of first clock signal output terminals outputs a non-trigger signal; and at the second moment, the level conversion unit outputs at least one clock signal by the second portion of the plurality of first clock signal output terminals, so that the second portion of the plurality of first output signals is at least one clock signal, and the first portion of the plurality of first clock signal output terminals outputs a non-trigger signal.

4. The driving circuit according to claim 1, wherein the first portion of the 2n gate signal output terminals comprises at least an odd-numbered output terminal, and the second portion of the 2n gate signal output terminals comprises at least an even-numbered output terminal.

5. The driving circuit according to claim 4, wherein at the first moment, the level conversion unit outputs at least one clock signal by a first portion of the plurality of first clock signal output terminals, so that the first portion of the plurality of first output signals is at least one clock signal, and a second portion of the plurality of first clock signal output terminals outputs a non-trigger signal; and at the second moment, the level conversion unit outputs at least one clock signal by the second portion of the plurality of first clock signal output terminals, so that the second portion of the plurality of first output signals is at least one clock signal, and the first portion of the plurality of first clock signal output terminals outputs a non-trigger signal.

6. The driving circuit according to claim 5, wherein the level conversion unit further comprises a control signal receiving terminal and a control signal output terminal;

the control signal receiving terminal comprises a first receiving terminal and a second receiving terminal, and the control signal output terminal comprises a first output terminal and a second output terminal;

the first receiving terminal is configured to receive a frame start signal, and the first output terminal is configured to provide the frame start signal to the gate electrode driving unit, so that the gate electrode driving unit starts to shift and output a gate scan signal in response to the frame start signal; and the second receiving terminal is configured to receive a reset signal, and the second output terminal is configured to provide the reset signal to the gate electrode driving unit, so that the gate electrode driving unit performs resetting in response to the reset signal.

7. The driving circuit according to claim 6, wherein the level conversion unit comprises a first conversion unit and a second conversion unit;

the first conversion unit comprises a first portion of the plurality of first clock signal output terminals, and the first portion of the plurality of first clock signal output terminals is configured to provide the first portion of the plurality of first output signals to the gate electrode driving unit; and the second conversion unit comprises a second portion of the plurality of first clock signal output terminals, and the second portion of the plurality of first clock signal output terminals is configured to provide the second portion of the plurality of first output signals to the gate electrode driving unit.

8. The driving circuit according to claim 1, wherein at the first moment, the level conversion unit outputs at least one clock signal by a first portion of the plurality of first clock signal output terminals, so that the first portion of the plurality of first output signals is at least one clock signal, and a second portion of the plurality of first clock signal output terminals outputs a non-trigger signal, so that the first gate scan signals are the trigger signals and the second gate scan signals are the non-trigger signals; and at the second moment, the level conversion unit outputs at least one clock signal by the second portion of the plurality of first clock signal output terminals, so that the second portion of the plurality of first output signals is at least one clock signal, and the first portion of the plurality of first clock signal output terminals outputs a non-trigger signal, so that the first gate scan signals are the non-trigger signals and the second gate scan signals are the trigger signals.

9. The driving circuit according to claim 1, wherein the level conversion unit further comprises a control signal receiving terminal and a control signal output terminal;

the control signal receiving terminal comprises a first receiving terminal and a second receiving terminal, and the control signal output terminal comprises a first output terminal and a second output terminal;

the first receiving terminal is configured to receive a frame start signal, and the first output terminal is configured to provide the frame start signal to the gate electrode driving unit, so that the gate electrode driving unit starts to shift and output a gate scan signal in response to the frame start signal; and the second receiving terminal is configured to receive a reset signal, and the second output terminal is configured to provide the reset signal to the gate electrode driving unit, so that the gate electrode driving unit performs resetting in response to the reset signal.

10. The driving circuit according to claim 1, wherein the level conversion unit comprises a first conversion unit and a second conversion unit;

the first conversion unit comprises a first portion of the plurality of first clock signal output terminals, and the first portion of the plurality of first clock signal output terminals is configured to provide the first portion of the plurality of first output signals to the gate electrode driving unit; and the second conversion unit comprises a second portion of the plurality of first clock signal output terminals, and the second portion of the plurality of first clock signal output terminals is configured to provide the second portion of the plurality of first output signals to the gate electrode driving unit.

11. The driving circuit according to claim 10, wherein the first conversion unit and the second conversion unit are integrated on a same chip.

12. The driving circuit according to claim 10, wherein the first conversion unit and the second conversion unit are respectively on different chips.

13. The driving circuit according to claim 1, wherein the driving circuit further comprises a timing controller, the timing controller comprises a plurality of initial clock signal output terminals, and the timing controller is configured to provide the plurality of first clock signals to the level conversion unit by the plurality of initial clock signal output terminals.

14. The driving circuit according to claim 13, wherein the timing controller is further configured to provide a data signal of a display row, and a data signal of a display row provided at the first moment is different from a data signal of a display row provided at the second moment.

15. The driving circuit according to claim 14, wherein the data signal of the display row provided at the first moment and the data signal of the display row provided at the second moment are complementary to each other.

16. The driving circuit according to claim 15, wherein the level conversion unit comprises a first conversion unit and a second conversion unit;

the plurality of initial clock signal output terminals comprises a first output terminal group and a second output terminal group;

the first output terminal group is configured to provide a first portion of the plurality of first clock signals to the first conversion unit; and the second output terminal group is configured to provide a second portion of the plurality of first clock signals to the second conversion unit.

17. The driving circuit according to claim 13, wherein the level conversion unit comprises a first conversion unit and a second conversion unit;

the plurality of initial clock signal output terminals comprises a first output terminal group and a second output terminal group;

the first output terminal group is configured to provide a first portion of the plurality of first clock signals to the first conversion unit; and the second output terminal group is configured to provide a second portion of the plurality of first clock signals to the second conversion unit.

18. A display device, comprising a driving circuit according to claim 1, and a display panel, wherein the driving circuit comprises a level conversion unit and a gate electrode driving unit, the level conversion unit comprises a plurality of first clock signal input terminals and a plurality of first clock signal output terminals, and the level conversion unit is configured to convert a plurality of first clock signals received by the plurality of first clock signal input terminals into a plurality of second clock signals and provide a plurality of first output signals to the gate electrode driving unit by the plurality of first clock signal output terminals, respectively;

the gate electrode driving unit comprises a plurality of second clock signal input terminals and 2n gate signal output terminals, the plurality of second clock signal input terminals are configured to receive the plurality of first output signals, and n is an integer greater than or equal to 1;

the gate electrode driving unit is configured to sequentially shift and output a plurality of first gate scan signals by a first portion of the 2n gate signal output terminals in response to a first portion of the plurality of first output signals received at a first moment by a first portion of the plurality of second clock signal input terminals, and sequentially output a plurality of second gate scan signals by a second portion of the 2n gate signal output terminals in response to a second portion of the plurality of first output signals received at a second moment by a second portion of the plurality of second clock signal input terminals; and the display panel is coupled to the driving circuit, and the driving circuit is configured to provide the plurality of first gate scan signals and the plurality of second gate scan signals to the display panel.

19. A driving method, applied to the driving circuit according to claim 1, wherein the driving method comprises:

converting the plurality of first clock signals into the plurality of second clock signals in response to the plurality of first clock signal input terminals receiving the plurality of first clock signals, and providing the plurality of first output signals to the plurality of second clock signal input terminals by the plurality of first clock signal output terminals;

sequentially shifting and outputting the plurality of first gate scan signals by the first portion of the 2n gate signal output terminals in response to the first portion of the plurality of first output signals received at the first moment by the first portion of the plurality of second clock signal input terminals; and sequentially shifting and outputting the plurality of second gate scan signals by the second portion of the 2n gate signal output terminals in response to the second portion of the plurality of first output signals received at the second moment by the second portion of the plurality of second clock signal input terminals.

20. A driving method, applied to the driving circuit according to claim 1, wherein the driving method comprises:

converting the plurality of first clock signals into the plurality of second clock signals in response to the plurality of first clock signal input terminals receiving the plurality of first clock signals, and providing the plurality of first output signals to the plurality of second clock signal input terminals by the plurality of first clock signal output terminals;

sequentially shifting and outputting the plurality of first gate scan signals by the first portion of the 2n gate signal output terminals of a first portion of the plurality of cascaded shift register units in response to the first portion of the plurality of first output signals received at the first moment by the first portion of the plurality of second clock signal input terminals; and sequentially shifting and outputting the plurality of second gate scan signals by the second portion of the 2n gate signal output terminals of a second portion of the plurality of cascaded shift register units in response to the second portion of the plurality of first output signals received at the second moment by the second portion of the plurality of second clock signal input terminals.

* * * * *